United States Patent
Gschwendtner et al.

(10) Patent No.: US 6,708,148 B2
(45) Date of Patent: Mar. 16, 2004

(54) CORRECTION DEVICE TO MARK PARTS OF A RECOGNIZED TEXT

(75) Inventors: Wolfgang Gschwendtner, Vienna (AT); Kresimir Rajic, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/267,241

(22) Filed: Oct. 9, 2002

(65) Prior Publication Data

US 2003/0110030 A1 Jun. 12, 2003

(30) Foreign Application Priority Data

Dec. 10, 2001 (EP) .............................. 01000534

(51) Int. Cl.[7] .................. G10L 15/26; G10L 21/00; G06F 17/20; G06F 17/24
(52) U.S. Cl. .................. 704/235; 704/251; 704/260; 704/270; 715/531; 715/500.1
(58) Field of Search .................. 715/531, 500; 704/275, 270, 260, 257, 251, 235, 215, 201; 345/861

(56) References Cited

U.S. PATENT DOCUMENTS

| | | | | |
|---|---|---|---|---|
| 5,262,760 A | * | 11/1993 | Iwamura et al. | 345/861 |
| 5,799,273 A | * | 8/1998 | Mitchell et al. | 704/235 |
| 5,855,000 A | * | 12/1998 | Waibel et al. | 704/235 |
| 5,960,447 A | * | 9/1999 | Holt et al. | 715/500 |
| 6,161,087 A | * | 12/2000 | Wightman et al. | 704/215 |
| 6,360,237 B1 | * | 3/2002 | Schulz et al. | 715/531 |
| 2002/0002459 A1 | * | 1/2002 | Lewis et al. | 704/260 |
| 2002/0062214 A1 | * | 5/2002 | Hanson | 704/260 |

* cited by examiner

*Primary Examiner*—Richemond Dorvil
*Assistant Examiner*—V. Paul Harper
(74) *Attorney, Agent, or Firm*—John Vodopia

(57) ABSTRACT

In a correction device (3, 4) for correcting a text (ET) recognized by a speech recognition device (2) from a spoken text (GT), marking means (12, 15, 17) are provided for storing marking information (WMI) in memory means (8), which marking information (WMI) flags those parts of the recognized text (ET) and/or of the spoken text (GT) that were reproduced at least once by reproduction means (13) in a synchronous reproduction mode. In this way, parts of the recognized text (ET) and the spoken text (GT) that have already been reproduced once can be acoustically or visually marked, and different parts can be reproduced depending on whether reproduction takes place for the first time or is repeated.

7 Claims, 5 Drawing Sheets

| CMI | | PMI | HMI | GMI | DMI | RMI | WMI |
|---|---|---|---|---|---|---|---|
| ET | BI | | | | | | |
| ... | ... | ... | ... | | | | ... |
| TS7-TS9 | BI12 | AS21 | TS3 | AS51 | TS80-TS86 | TS22 | AS1-AS53 |
| TS4-TS5 | BI12 | AS26 | | TS53 | | TS26-TS28 | AS50-AS500 |
| TS73-76 | BI13 | AS52 | | | | | |
| ... | ... | ... | ... | | | | ... |

Fig.4

MT

```
       AS2    AS3    AS4  AS5  AS6  AS7  AS8  AS9    AS10
"...company ahhhh bold next no next word bold PHILIPS..."

AS20  AS22   AS24   AS26    AS28
"... I -- I fixed the left ---- the left leg..."
   AS21  AS23    AS25    AS27   AS29
        AS50          AS52            AS54        AS56
"... and person sneezes ----- tatat company PHILIPS will ..."
              AS51          AS53         AS55
 AS70  AS72          AS74        AS76
"...is the best. Insert text module one. All ..."
      AS71      AS73      AS75          AS77
 AS80     AS82      AS84         AS86
"...tenth of October two thousand and one..."
  AS81        AS83        AS85
```

Fig.5

"...company <hes> <com> <skip> <com> PHILIPS..."

"... I <rep> fixed the left <rep> leg..."

"...and <non sp> <sil> <non sp> company PHILIPS will..."

"...is the best. <module 1>. All ..."

"...<date> Oct.10th, 2001..."

"...company PHILIPS..."

"... the left leg..."

"...and company PHILIPS will..."

"...is the best. The patient is ... not now. All ..."

"... Oct.10<sup>th</sup>, 2001..."

CORRECTION DEVICE TO MARK PARTS OF A RECOGNIZED TEXT

The invention relates to a correction device for correcting a text recognized by a speech recognition device from a spoken text, wherein the recognized text contains words that are correctly recognized for spoken words of the spoken text and words that are not correctly recognized therefor.

The invention further relates to a method of correction for correcting a text recognized by a speech recognition device from a spoken text, wherein the recognized text contains words that are correctly recognized for spoken words of the spoken text and words that are not correctly recognized therefor.

A correction device of this kind and a method of correction of this kind are known from U.S. Pat. No. 5,031,113, in which a dictating device is disclosed. The known dictating device is formed by a computer, which runs speech recognition software and text processing software. A user of the known dictating device can speak a spoken text into a microphone connected to the computer. The speech recognition software, which forms a speech recognition device, performs a speech recognition process and in so doing allocates a recognized word to each spoken word of the spoken text, as a result of which a recognized text is obtained for the spoken text. Also, in the course of the speech recognition process, link information is determined that flags the word of the recognized text that was recognized for each spoken word of the spoken text.

The known dictating device also forms a correction device with which incorrectly recognized words can be replaced with correction words. For this purpose a user of the correction device can activate a synchronous reproduction mode of the correction device, in which the spoken text is reproduced acoustically and synchronously with this the words of the recognized text flagged by the link information are highlighted (i.e. marked) visually. The synchronous reproduction mode has proved in practice to be particularly advantageous for the correction of text recognized by the speech recognition device. It has further been found that many users do not check the entire recognized text with the help of the synchronous reproduction mode but only certain parts thereof. These certain parts may be, for example, parts of the text that are particularly critical and that must be absolutely free from errors, or they may be parts of the text that are particularly difficult for the speech recognition software to recognize and that are therefore likely to contain a large number of incorrectly recognized words.

It was found to be a disadvantage in the known correction device that, after correcting the recognized text with the correction device, a user has no way of determining which parts of the recognized text have been corrected with the aid of the synchronous reproduction mode and which parts have still to be corrected therewith.

It is an object of the invention to provide a correction device of the kind defined in the first paragraph above and a method of correction of the kind defined in the second paragraph above, in which the disadvantage described above is avoided.

To achieve the object indicated above, features according to invention are proposed for a correction device of this kind, such that the correction device can be characterized in the manner detailed below.

A correction device for correcting a text recognized by a speech recognition device from a spoken text, wherein an item of link information for each part of the spoken text flags the associated recognized text, having memory means for storing at least the spoken text and the recognized text, and having reproducing means for acoustically reproducing the spoken text and visually marking, synchronously, the associated recognized text flagged by the link information when a synchronous reproduction mode is activated in the correction device, and having marking means to store marking information in the memory means, which marking information flags those parts of the recognized text and/or of the spoken text that were reproduced at least once by the reproduction means when the synchronous reproduction mode was activated.

To achieve the object indicated above, features according to invention are proposed for a method of correction of this kind such that the method of correction can be characterized in the manner detailed below.

A method of correction for correcting a text recognized by a speech recognition device from a spoken text, wherein an item of link information for each part of the spoken text flags the associated recognized text and wherein the following steps are performed:

storage of at least the spoken text and the recognized text;

when the synchronous reproduction mode is activated, acoustic reproduction of the spoken text and synchronous visual marking of the associated recognized text flagged by the link information;

storage of marking information, which marking information flags those parts of the recognized text and/or of the spoken text that were reproduced at least once before when the synchronous reproduction mode was activated.

The features according to the invention achieve that those parts of the recognized text and/or those parts of the spoken text that were reproduced acoustically and were visually marked at least once when the synchronous reproduction mode was activated are flagged by marking information. In this way the correction device is able, advantageously, either to mark visually the part of the recognized text that has already been corrected once with the help of the synchronous reproduction mode, or to mark acoustically the associated part of the spoken text. This enables a user of the correction device according to the invention to correct the recognized text considerably more efficiently.

The provisions of claim 2 and claim 8 offer the advantage that unwanted parts of the spoken text flagged by the speech recognition device or by the correction device as suppression information are not reproduced acoustically during the synchronous reproduction mode. During the synchronous reproduction mode the user is thus able to concentrate more satisfactorily on the essential parts of the spoken text and the associated parts of the recognized text. Also, the acoustic reproduction can be speeded up, so that advantageously a recognized text can be corrected more quickly.

The provisions of claim 3 and claim 9 offer the advantage that certain parts of the spoken text, though unwanted, are still reproduced, namely when the user listens to such parts of the spoken text for a second or further time. This is particularly advantageous because unwanted parts of the spoken text of this kind often cause incorrectly recognized words to be recognized when the speech recognition process is performed, and by listening to these unwanted parts of the text the user is more easily able to draw conclusions as to the word that ought really to have been recognized.

The provisions of claim 4 provide a list of those parts of the spoken text that it is particularly advantageous to have marked as unwanted by suppression information. Such unwanted parts of the text are thus parts of the spoken text where the user made a pause (=silence) while dictating or where he repeated a word or made a so-called hesitating sound (e.g. aah, mm . . . ) as he thought about the next sentence.

The provisions of claim 5 offer the advantage that the correction device visually marks that part of the recognized text that has already been reproduced at least once, and thus corrected, in the synchronous reproduction mode for the benefit of a user or a person who has to check the work of users of the correction device. As a result, professional transcription services can provide an effective quality control.

The provisions of claim 6 offer the advantage that, depending on whether or not the recognized text and the associated spoken text have already been reproduced once in the synchronous reproduction mode, positioning means belonging to the correction device position a text cursor N words or M words upstream of the word that is marked the moment the synchronous reproduction mode is interrupted. The numbers defined could be, for example, M=3 and N=1, as a result of which allowance would be made for the longer response time of the corrector when an incorrectly recognized word is found in the recognized text for the first time. These provisions are particularly advantageous because the text cursor is usually already positioned on the incorrectly recognized word to be corrected once the synchronous reproduction mode has been interrupted, and time taken to position the text cursor manually can thus be saved.

The invention will now be described in more detail with reference to the drawings, which show a single embodiment as an example but to which the invention is not limited.

FIG. 4 shows a marking table stored in memory means of the transcription device.

FIG. 5 shows, in symbolic form, five examples of a text spoken by a user of the transcription device.

Figure 1:
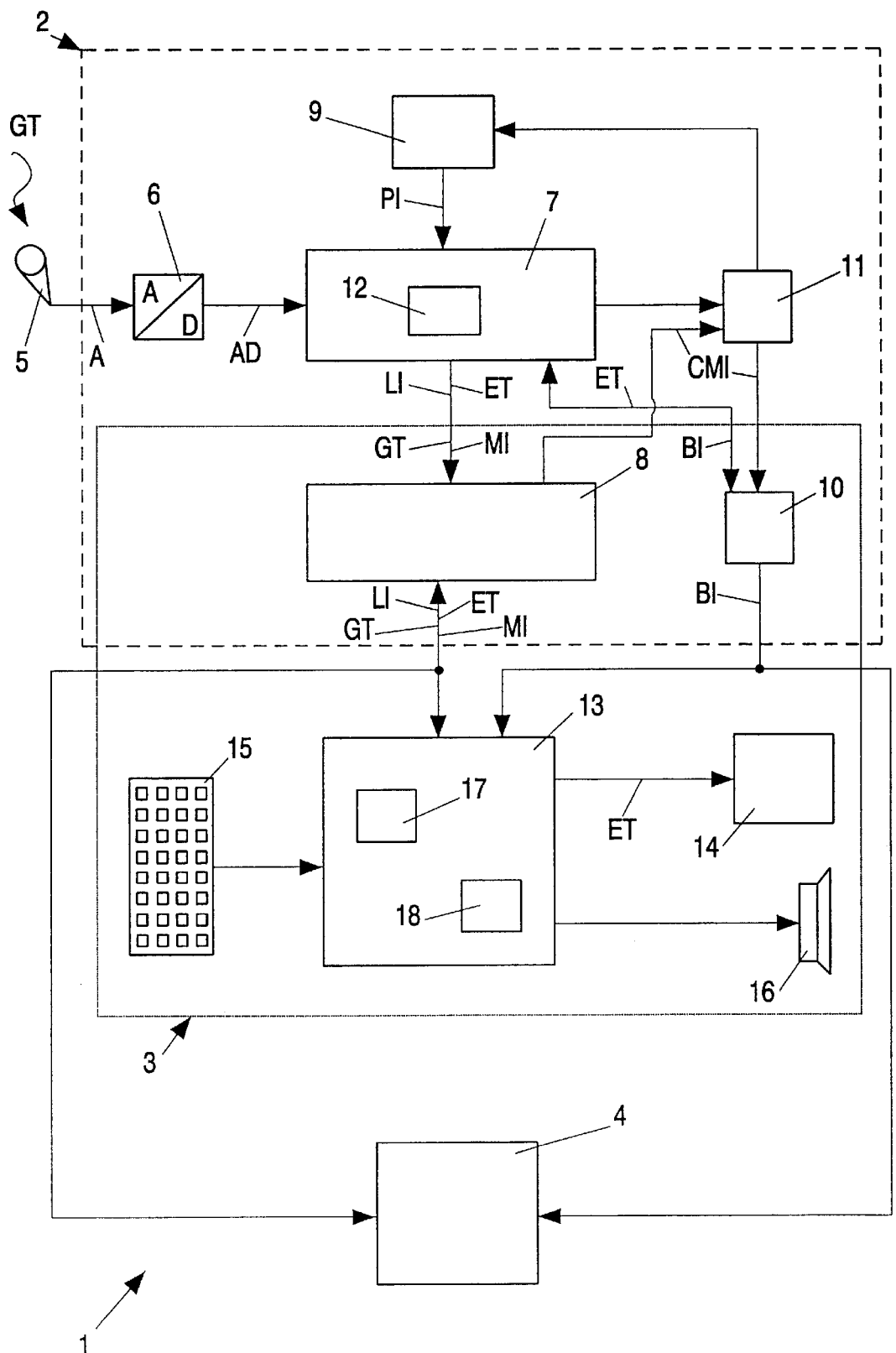
FIG. 1 shows a transcription device for transcribing a spoken text into a recognized text, wherein a correction device is provided for correcting the recognized text.

FIG. 1 shows a transcription device 1 for transcribing a spoken text GT into a recognized text ET and for editing parts of the recognized text ET that were not correctly recognized. The transcription device 1 is formed by a first computer, which runs speech recognition software and forms a speech recognition device 2, and by a second and a third computer, which second and third computers each run text processing software and form a first correction device 3 and a second correction device 4 to correct parts of the text that have not been correctly recognized. It may be mentioned that a transcription device according to invention could also be formed by only one computer forming both a speech recognition device and a correction device, which computer would then have to run both the speech recognition software and the text processing software.

Connected to the first computer forming the speech recognition device 2 is a microphone 5 from which an audio signal A representing the spoken text GT can be emitted. The speech recognition device 2 contains an A/D converter 6, speech recognition means 7, memory means 8, parameter memory means 9, command memory means 10, and an adapting stage 11. The audio signal A emitted by the microphone 5 can be fed to the A/D converter 6, which converts the audio signal A into digital audio data AD.

The audio data AD representing the spoken text GT can be fed to the speech recognition means 7 and can be stored thereby in the memory means 8. When the speech recognition process is being performed by the speech recognition means 7, the speech recognition means 7 are arranged to determine the recognized text ET, parameter information PI stored in the parameter memory means 9 being taken into consideration in so doing. The parameter information PI in this case contains vocabulary information, language model information, and acoustic information.

The vocabulary information contains all words that can be recognized by the speech recognition means 7 plus associated phoneme sequences. The language model information contains statistical information relating to word sequences that are usual in the language of the spoken text GT. The acoustic information contains information about the special features of the pronunciation of a user of the transcription device 1 and about acoustic characteristics of the microphone 5 and the A/D converter 6.

The disclosure of U.S. Pat. No. 5,031,113 is deemed to be incorporated into the disclosure of the present patent by reference, and since the performance of a speech recognition process in the light of parameter information PI of this kind is disclosed in said U.S. patent, a detailed description thereof will not be given here. The result of the speech recognition process is that text data containing the recognized text ET can be stored in the memory means 8 by the speech recognition means 7.

During the performance of the speech recognition process, link information LI, which flags the associated text ET that is recognized by the speech recognition means 7 for each part of the spoken text GT, can also be determined by the speech recognition means 7. The production of the link information LI is likewise disclosed in U.S. Pat. No. 5,031,113, for which reason it is not discussed in detail here.

Figures 2, 3:
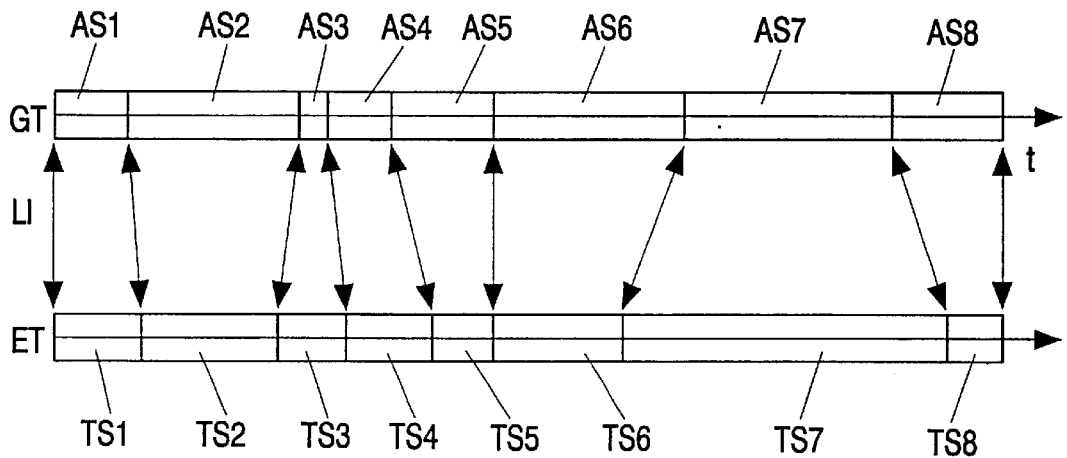
FIG. 2 shows, in symbolic form, a spoken text, a corresponding text recognized by the transcription device, and link information that flags the associated segment of the recognized text for each audio segment of the spoken text.
FIG. 3 shows a command table stored in a command memory stage of the transcription device.

In FIG. 2, a text GT spoken by an author—that is to say by a user of the speech recognition device 2—into the microphone 5 is shown in symbolic form along a time axis t. The text ET recognized for this spoken text GT by the speech recognition means 7 is also shown. As the speech recognition process is being performed, the spoken text GT is divided into audio segments AS that contain the associated acoustic information. Associated acoustic information of this kind may be, for example, a word, a longish speech pause between two words, a so-called hesitating sound such as "aah" or "mm", or a noise.

The link information LI flags the beginning and end of each audio segment AS of the spoken text GT and of the associated segment TS of the recognized text ET. A first audio segment AS1, for example, contains the acoustic information, lasting 1.5 seconds, for the first word "The" of a spoken text GT, and a first text segment TS1 allocated by the link information LI contains the text of the word "The" that was recognized by the speech recognition means 7.

The command memory stage 10 stores sequences of words that are recognized by the speech recognition device 2 as commands. Part of a command table BT stored in the command memory stage 10 is shown in FIG. 3. Through reference to the command table BT the speech recognition means 7 recognize the sequence of words "next word bold", for example, as a command for the next word in the recognized text ET to be shown in bold. A command number BI12 is assigned to this command in the command table BT. The sequence of words "insert text of module 1" is likewise recognized as a command, in this case for a standard text from a text module stored at a memory location in position "2341" in the command memory stage 10 to be inserted into the recognized text ET.

The speech recognition means 7 further comprise a first marking stage 12, which is arranged for the automatic determination of different items of marking information MI and for storing the items of marking information MI so determined in the memory means 8, which items of marking information MI flag parts of the recognized text ET and of the spoken text GT that have a certain characteristic common to all the parts of the text so marked. The word "automatic" is to be understood in this context as meaning "without any action by the user of the transcription device 1". The first marking stage 12 is arranged for the automatic marking of longish speech pauses with pause marking information PMI, of hesitating sounds with hesitating sound marking information HMI, of commands with command marking information CMI, of repeated words with repetition marking information RMI, of dates with date marking information DMI, and of noises with noise marking information GMI.

FIG. 4 shows a marking table MT stored in the memory means 8, in which table items of marking information MI automatically determined by the first marking stage 12 are entered by the first marking stage 12. For the automatic marking of commands in the recognized text ET, the first marking stage 12 compares the word sequences contained in the command table BT with the word sequences contained in the recognized text ET. When a word sequence contained in the command table BT is found in the recognized text ET, then the first marking stage 12 enters those text segments TS of the recognized text ET that identify this sequence of words, plus the associated command number BI, in the marking table MT as command marking information CMI. This is described in greater detail below with reference to an application example.

It may be mentioned that, rather than identifying certain text segments TS of the recognized text ET in the marking table MT, it would also be possible for the appropriate audio segments AS of the spoken text GT to be entered in each case. The audio segments AS and the text segments TS associated in each case can be determined with the aid of the link information LI.

The speech recognition means 7 are arranged to recognize pauses in speech (silence) between two words and the first marking stage 12 is arranged to automatically mark corresponding audio segments AS of the spoken text GT with the pause marking information PMI in the marking table MT.

The first marking stage 12 is arranged to compare hesitating sounds (e.g. "aah" or "mhh") stored in the first marking stage 12 with words contained in the recognized text ET and to automatically mark text segments TS of the recognized text ET containing such hesitating sounds with the hesitating sound marking information ZMI.

The first marking stage 12 is also arranged to automatically mark audio segments AS of the spoken text GT with the noise marking information GMI if these audio segments AS contain noises and/or sounds. For this purpose the marking stage 12 contains a noise detector that is able to differentiate noises and/or sounds from audio segments containing words.

For marking repeated words in the recognized text ET with the repetition marking information RMI, the first marking stage 12 is arranged to compare words or sequences of words that follow one another in the recognized text ET. The marking table MT also contains the date marking information DMI that is described in greater detail below with reference to application examples.

The first correction device 3 of the transcription device 1 comprises reproduction means 13, which, together with the memory means 8 and the command memory stage 10, are formed by the second computer that runs the text processing software. Also connected to the second computer are a monitor 14, a keyboard 15, and a loudspeaker 16, which are likewise associated with the first correction device 3. The reproduction means 13 are arranged for the acoustic reproduction of the spoken text GT and for the synchronous visual or optical marking of the associated recognized text ET flagged by the link information LI when the synchronous reproduction mode is activated in the first correction device 3.

Correction of recognized text ET in the activated synchronous reproduction mode is again disclosed in U.S. Pat. No. 5,031,113 and has proved to be very advantageous in practice. In this case a corrector—that is to say a user of the first correction device 3 who is correcting the recognized text ET—can at the same time listen to the text GT spoken by the author into the microphone 5 and check or edit the text ET that was recognized for it by the speech recognition means 7. The recognized text ET is optically displayed on the monitor 14 and the word that was recognized by the speech recognition means 7 for the spoken word just reproduced acoustically, is optically marked by the reproduction means 13 and displayed accordingly on the monitor 14. The corrector can activate, interrupt, and deactivate the synchronous reproduction mode and edit the recognized text ET with the keyboard 15.

The construction of the second correction device 4 is substantially the same as that of the first correction device 3 shown in detail in FIG. 1, for which reason the second correction device 4 is only shown as a block in FIG. 1. The second correction device 4, however, is physically separate from the speech recognition device 2, for which reason the second correction device 4 in addition has memory means and command memory means in which the information stored in the memory means 8 and command memory stage 10 is stored before the recognized text ET corrected with the first correction device 3 is edited.

The second correction device 4 may be used, for example, by a checker—i.e. a user of the second correction device 4—who, after the recognized text ET stored in the memory means 8 has been corrected by the corrector, checks the quality of the work done by the corrector. For this purpose the checker checks to see whether the corrector has missed any errors in the recognized text ET. Such checkers are mainly used by transcription firms, which ensure the quality of the transcribed texts by random checking of corrected recognized texts. This is described in detail with reference to the application examples of the transcription device 1.

The reproduction means 13 of the transcription device 1 further comprise a second marking stage 17 that, together with the keyboard 15 and the first marking stage 12, forms the marking means for automatic and manual marking of parts of the spoken text GT or recognized text ET. With the second marking stage 17, the corrector, when correcting the recognized text ET, has an opportunity to manually mark further parts of the text that were not marked automatically.

This manual marking of parts of the text may on the one hand be used to manually mark parts of the recognized text ET that have the same characteristic as parts of the text that have already been marked automatically, to allow the parameter information PI or the information stored in the command table BT to be adapted with the aid of the adapting stage 11. This adaptation achieves that next time the first marking stage 12 will be able to mark automatically the parts of the text that have been marked manually. In addition the recognition rate of the speech recognition device 2 is improved with each adaptation. As a result the advantage is obtained that the transcription device can reduce the work the corrector has to do more and more with each further use.

This manual marking of parts of the text on the other hand be used to mark parts of the text as deleted, which will then not appear in the recognized text conveyed to the author but nevertheless are not totally deleted. Marking a part of the text as deleted has the advantages that such parts of the text can be re-included in the recognized text at a later stage if necessary, and that the checker can check whether it was correct for these parts of the text to be deleted. However, it is especially advantageous that the connection provided by the link information LI between spoken text GT and recognized text ET remains fully intact, since no part of the recognized text ET is actually deleted. Hence, when the synchronous reproduction mode is activated, while parts of the spoken text GT marked as deleted are being acoustically reproduced, a replacement text can be optically marked instead of the deleted part of the text, which is described in detail below.

This supplementation of the automatic marking of parts of the text with the manual marking of parts of the text that have the same characteristic provides the further advantage that the edited recognized text ET can be further edited in a particularly efficient way. Thus, for example, the formatting of all the parts of the recognized text marked as dates can be uniformly amended with particular efficiency, as is described in detail below.

The second marking stage 17 of the marking means is also arranged for storing reproduction marking information WMI in the memory means 8, which reproduction marking information WMI flags those parts of the recognized text ET and/or the spoken text GT that have been reproduced at least once by the reproduction means 13 in the activated synchronous reproduction mode.

As a result, the advantage is obtained that by evaluating the reproduction marking information WMI contained in the marking table MT the reproduction means 13 is able either to mark visually the part of the recognized text ET that has already been corrected once with the aid of the synchronous reproduction mode or to mark acoustically the associated part of the spoken text GT. As a result a user of the correction device according to the invention is able to correct the recognized text considerably more efficiently, which is described in detail below with reference to an application example.

The reproduction means 13 are furthermore arranged to suppress the acoustic reproduction of unwanted parts of the spoken text GT when the synchronous reproduction mode is activated, which unwanted parts are flagged by suppression information stored in the memory means 8. This being the case, the corrector can use the keyboard 15 to set which of the items of marking information MI contained in the marking table MT are to be used as suppression information. The user may, for example, select the pause marking information PMI and the hesitating sound marking information HMI as suppression information, so that the parts of the text thus marked are suppressed when the spoken text GT is played back for the first time. This is described in detail with reference to an application example.

Figures 6, 7:
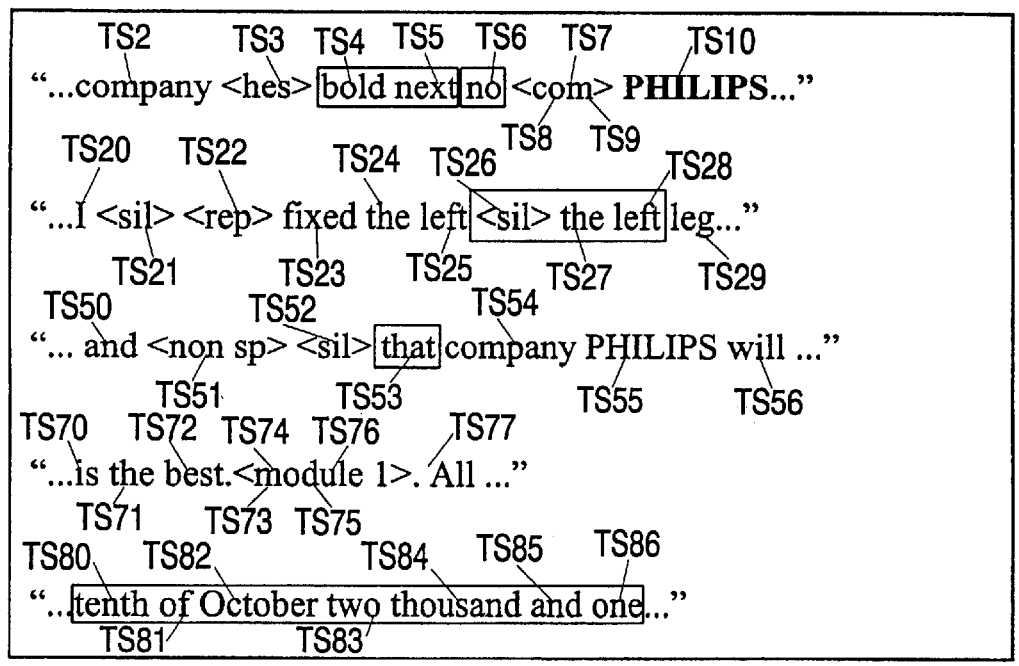
FIG. 6 shows, in symbolic form, the text that is recognized by the speech recognition means of the transcription device for the five examples of spoken text, where parts of the recognized text have been marked automatically by a first marking stage of the speech recognition means and a user has marked further parts of the text manually with a second marking stage.
FIG. 7 shows, in symbolic form, the texts displayed by the correction device of the transcription device for the five examples, where both the automatically and the manually marked texts of the recognized text are displayed as replacement texts.
Figures 8, 9:
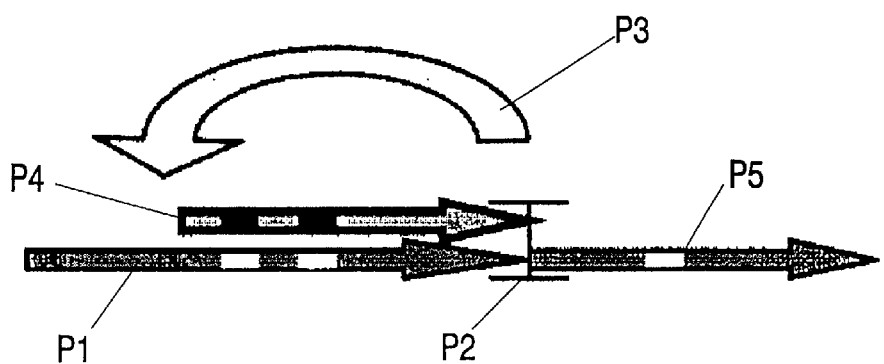
FIG. 8 shows, in symbolic form, the text displayed by the correction device when all the replacement texts for marked parts of the text are suppressed.
FIG. 9 shows, in symbolic form, which parts of the text are reproduced during the first and a subsequent second synchronous reproduction of the spoken and recognized text.

The advantages of the transcription device 1 will now be explained in detail below with reference to the application examples shown in FIGS. 3 to 9. FIG. 5 shows five parts of a text GT spoken by the author into the microphone 5. FIG. 6 shows the text ET recognized by the speech recognition means 7 for the five parts of the spoken text GT, where parts of the recognized text ET have already been automatically marked by the first marking stage 12. Also shown in FIG. 6 are parts of the text marked manually by the corrector with the aid of the second marking stage 17. FIG. 7 shows the recognized text ET in a form in which parts of the text that were marked automatically and manually are shown replaced with replacement texts. FIG. 8 shows the recognized text ET in a form in which all the marked parts of the text have been suppressed, in which form the recognized text ET is conveyed to the author.

In the first example, the author wanted to say the text ". . . company PHILIPS . . . " into the microphone and at the same time to mark the word "PHILIPS" as bold. However, after the word "company", the author briefly reflects on what exactly the wording is for the command for bold formatting and as he does so he makes the hesitating sound "aah", as many authors do. The author then says "bold next", but as he does so it occurs to him that the correct sequence of words for this command is "next word bold", for which reason he says "no". He then says the correct command "next word bold" and continues the text with the word "PHILIPS".

As can be seen from FIG. 6, the speech recognition means 7 recognize the text segment TS3="aah" for the audio segment AS3 and in the fourth line of the marking table MT the first marking stage 12 automatically marks this hesitating sound with the hesitating sound marking information HMI. Instead of the hesitating sound, the replacement text "<hes>" is shown in FIG. 6, which allows the corrector to see that a hesitating sound has been marked at this point. If, when editing the recognized text ET, the corrector positions a text cursor of the reproduction means 13 on this replacement text, then the hesitating sound recognized by the speech recognition means 7 is displayed. As a result, the advantage is obtained that, when correcting, the corrector can concentrate on the essential parts of the recognized text ET but, if he wants to know what hesitating sound the author made here so that he can correct a word adjacent to the hesitating sound, he is able see this sound at any time.

Also, the speech recognition means 7 have now recognized, for audio segments AS7–AS9, the word sequence "next word bold" formed by text segments TS7–TS9, to which the command having the command number B112 is assigned in the command table BT. The first marking stage 12 advantageously automatically enters these text segments and this command number in the fourth line of the marking table MT as command marking information CMI. In FIG. 6 the replacement text "<com>" is shown instead of these text segments, as a result of which the aforementioned advantages are obtained. Also, command B112 is carried out and the word "PHILIPS", forming the text segment TS10 that was recognized for audio segment AS10, is displayed in bold.

Using keyboard 15 and the second marking stage 17, the corrector now marks text segments TS4 and TS5 as a command having the command number BI12, so that next time the word sequence "bold next" will automatically be recognized as a command by the first marking stage 12. In FIG. 7 this part of the text is likewise represented by the replacement text "<com>" for a command.

Using the command number BI12, the second marking stage 17 enters this word sequence TS4+TS5 in the fifth line of the marking table MT as command marking information CMI. When the adapting mode is activated in the speech recognition device 2, the adapting stage 11 reads the new command marking information CMI from the memory means 8 and makes a further entry in the command table BT for the command having the command number B112.

This gives the advantage that the corrector can define further word sequences as commands with particular ease and efficiency, which word sequences are taken over by the speech recognition device 2 in the adapting mode. When the speech recognition process is next performed, the word sequence "bold next" will thus automatically be recognized as a command.

By means of keyboard 15 and the second marking stage 17, the corrector now goes on to mark the text segment TS6 "no" as deleted text, because he has seen that the author said this word unintentionally and that it is not to be included in the final text conveyed to the author. The replacement text "<skip>" for this deleted text is shown in FIG. 7.

It may be mentioned that the corrector could also mark text segments TS4–TS6 as deleted text, because the command having the command number BI12 ought not to occur twice.

The manual marking of text segment TS6 as deleted text gives the advantage that the correlation provided by the link information LI will be fully preserved even during a subsequent synchronous reproduction mode performed with for example the second correction device 4, and the synchronous reproduction will thus take place without any errors.

FIG. 8 shows the recognized text ". . . company PHILIPS . . . " finally conveyed to the author in the first example, which text is what the author really meant in spite of hesitating sounds, one unintentionally spoken word, and a wrong command.

In the second example, the text that the author wants to speak into the microphone 5 is ". . . I fixed the left leg . . . ", but in this case he reflects after audio segment AS20 and is quiet for three seconds, which is automatically recognized by the first marking stage 12 as a pause and is entered in the marking table MT as pause marking information PMI. The replacement text "<sil>" for this pause for reflection is shown in FIG. 6.

Following the pause, the author repeats the word "T", which is automatically recognized by the first marking stage 12 as a repeated word and is entered in the marking table MT as repetition marking information RMI. The replacement text "<rep>" for text segment TS22 is shown in FIG. 6.

Following the repeated word, the author says "fixed the left", then makes another pause for reflection, and finally says "the left leg". The pause for reflection is again automatically marked by the first marking stage 12, but the repetition of the words "the left" could not be automatically recognized and marked. The corrector now marks text segments TS26–TS28 as repeated words manually, thus causing corresponding repetition marking information RMI to be entered in marking table MT.

FIG. 8 shows the recognized text ". . . the left leg . . . " finally conveyed to the author in the second example and that is thus what the author really meant in spite of repeated words and pauses for reflection. As result of the manual marking that was performed in addition to the automatic marking, all the repeated words are marked in the recognized text, and with further processing they could, for example, all be suppressed on the display or used for the adapting mode.

In the third example, the text the author wants to say into the microphone 5 is ". . . and company PHILIPS will . . . ", but he has to sneeze after the word "and". Audio segment AS51 therefore contains a noise that the author makes when sneezing. The speech recognition means 7 are unable to recognize a word for this audio segment AS51 and because of this the first marking stage 12 automatically marks this audio segment AS51 as noise with noise-marking information GMI and enters it as such in marking table MT. The replacement text "<non sp>" is shown in FIG. 6.

Following his sneeze, the author takes five seconds to find his handkerchief and then blows his nose. Audio segment AS52 in turn is automatically marked as a pause and entered as such in marking table MT. The noise that the author makes when blowing his nose is similar to the noise "tata", and for this reason the speech recognition means 7 incorrectly recognize the word "that" as text segment TS53.

Advantageously, the corrector, who immediately recognizes this error when the synchronous reproduction mode is activated, is able manually to mark text segment TS53 as noise with the noise-marking information GMI. The advantage is obtained thereby that all the noises in the recognized text ET are in fact marked as such in the third example and can all be processed in the same way during further stages of processing. The noise detector of the first marking stage 12 may, for example, be adapted with these marked parts of the text so that such noises can be recognized automatically in future.

In the fourth example, the author wishes to insert a standard text that is stored as a text module in the command memory stage 10 under the name "module 1" into the recognized text ET while he is actually dictating. For this purpose the author dictates ". . . is the best. Insert text module one. All . . . ". The text segments TS73–TS76 that are recognized are recognized as a command having the command number BI13 and the replacement text "<module 1>" is shown in FIG. 6.

This gives the advantage that a text module has automatically been inserted in a particularly simple way in the recognized text ET. The corrector or checker can advantageously choose between three types of display in this case. He may see the text that was actually recognized—text segments TS73–TS76—or the replacement text, or the standard text added from the command memory stage 10 that is seen in FIG. 8.

In the fifth example, the text that the author speaks into the microphone 5 is ". . . tenth of October two thousand and one . . . ". The word sequence that the first marking stage 12 would automatically have recognized and marked as a date would have been "October tenth two thousand and one". The word sequence that was spoken was not recognized as a date, however, and for this reason the corrector marks text segments TS80–TS86 as a date with the date-marking information DMI.

This gives the advantage that the format of all the parts of the text that have been automatically or manually marked as dates in the recognized text can be altered in a particularly easy and unified way in a subsequent processing operation. For this, the corrector may for example select that all dates marked with the date-marking information DMI are to be shown in the format "MM.DD.YYYY".

An example of the application of the first correcting device 3 will now be explained with reference to FIG. 9. It is assumed in this example that the corrector activates the synchronous reproduction mode, whereupon the spoken text GT and the recognized text ET are synchronously reproduced for the first time, starting from audio segment AS1 and text segment TS1, respectively. This is symbolically represented by the arrow P1. The corrector has configured the reproduction means 13 in such a way that during the first reproduction the audio segments for those parts of the text that are marked with the pause marking information PMI, the hesitating sound marking information HMI, and the noise marking information GMI are not reproduced acoustically. This allows the corrector to reproduce the spoken text GT particularly quickly and to correct more recognized text ET in the same time.

During reproduction, the reproduction marking information WMI in the marking table MT is continuously updated. The moment the audio segment AS53 (author blows his nose) is just being reproduced acoustically and the text segment TS53 being marked visually, the corrector sees that the word "that" has not been correctly recognized. The position of the text cursor at this time is indicated symbolically in FIG. 9 by P2. However, since the corrector is not sure what ought really to have been recognized, he again activates the synchronous reproduction mode starting from audio segment AS50. This is symbolically indicated in FIG. 9 by the arrow P3.

The reproduction means 13 now recognize from the reproduction marking information WMI entered in the fourth line of marking table MT that audio segments AS1 to AS53 have already been reproduced once in the synchronous reproduction mode and therefore reproduce all the audio segments AS50 to AS53 acoustically. This is symbolically indicated in FIG. 9 by the arrow P4. It is only starting from the reproduction of audio segment S54—see arrow P5—that marked texts (PMI, GMI, HMI) will again be suppressed during the acoustic reproduction.

This gives the advantage that all the audio segments AS of the dictation are reproduced in those passages in the dictation where the corrector needs all the marking information available to enable him to correct the recognized text ET correctly. In other passages, which the corrector can correct by listening to them only once, unnecessary audio segments AS are suppressed.

Similarly, the replacement texts for marked parts of the text may advantageously be displayed when the recognized text ET is reproduced for the first time, and a switch may automatically be made to the text ET actually recognized only when reproduction is repeated.

The automatic marking of parts of the text that have already been reproduced once in the synchronous reproduction mode yields a further outstanding advantage. It is the checker's job to determine by random sampling how well the corrector has corrected a recognized text ET. The reproduction marking information WMI is very helpful to the checker in this respect. This is because the checker can immediately recognize which parts of the text the corrector has checked with the help of the synchronous reproduction mode and which parts of the text he has skipped and therefore possibly not checked at all. The checker can thus make a special check on parts of the text that are not marked with the reproduction marking information WMI to see whether there are any errors in the recognized text ET.

The reproduction marking information WMI is also of advantage if the corrector was interrupted in his work and wants to go on with it at a later point in time. As a result of the acoustic marking (e.g. a continuous tone as the background of the spoken text) or visual marking (e.g. recognized text shown in reverse characters) of the text flagged by the reproduction marking information WMI, the corrector can immediately carry on with his work.

The first correction device 3 also has positioning means 18, which are provided to allow the text cursor marking a text input position to be positioned if the synchronous reproduction mode is interrupted to correct an incorrectly recognized word, the positioning means 18 being arranged to position the text cursor N words upstream of the word that is marked in the recognized text ET at the time when the synchronous reproduction mode is interrupted, if this part of the recognized text has already been marked with the reproduction marking information WMI, and the positioning means 18 being arranged to position the text cursor M words upstream of the word that is marked in the recognized text ET at the time when the synchronous reproduction mode is interrupted, if this part of the recognized text ET has not been marked with the reproduction marking information WMI.

The numbers defined could be, for example, M=3 and N=1, as a result of which allowance would be made for the longer response time of the corrector when an incorrectly recognized word is found in the recognized text ET for the first time. These provisions are particularly advantageous because the text cursor is usually already positioned on the incorrectly recognized word once the synchronous reproduction mode has been interrupted and the time taken to position the text cursor manually can be saved. This will make many other combinations of advantageous values of M and N obvious to those skilled in the art.

It would be particularly advantageous if the positioning means 18 were arranged to be self-teaching. In this case the positioning means 18 would determine the optimum values for N and M from the positioning entries made by the corrector after the synchronous reproduction mode has been interrupted (e.g. text cursor two words forward or five words back) and would continually adapt them to the response time of the user.

The adapting stage 11 may also be used to adapt the parameter information PI stored in the parameter memory means 9. This gives the advantage that the recognition rate of the speech recognition means 7 is steadily improved and fewer errors are contained in the recognized text ET.

As can be seen from the above application examples, individual audio segments or text segments can be marked by one or even more items of marking information MI. This allows the recognized text to be processed in an advantageous manner in so-called levels. This being the case, a hesitating sound contained in a command, for example, may be edited in the same way (e.g., suppressed, deleted, replacement text displayed, recognized text displayed) as all the other parts of the recognized text ET that are marked as hesitating sounds. Nor does this interfere with the editing of the command containing the hesitating sound. If parts of the text are marked with a plurality of items of marking information MI, it thus also becomes possible for these levels to be displayed optically.

It may be mentioned that the automatic and manual marking of texts according to the invention may be carried out with a plurality of different items of marking information MI. Items of marking information MI of this kind may be, for example: AutoPunctuation, Silence, NonSpeech, Noise, Music, Spelling, Hesitation, Insertion, NumberFormatting, DateFormatting, HeaderFormatting, EnumerationFormatting, QuantityFormatting, SelfCorrection, PhraseRepetition, Stutter, Discursiveness, SpellingSequence, RedundantPhrase, NotUnderstood, Remark, Deletion, Command.

It may be mentioned that the marking of parts of the text does not have to be performed as explained above by means of tables, but may alternatively take place in the form of a tree structure. In this case marked text segments that in turn contain further marked text segments would be shown on branches in a form similar to a tree.

It may be mentioned that the automatic marking may even take place while the speech recognition process is being performed instead of afterwards.

It may be mentioned that, for example, all the parts of the text that are only recognized with difficulty by the speech recognition means 7—i.e. probably with a large number of errors in recognition—can be marked automatically by the first marking stage 12, and all the parts of the text that are recognized as difficult by the corrector in the synchronous reproduction mode can be marked manually, in order to alert the checker or the author of the spoken text to these marked parts of the text for checking purposes. This is a particularly advantageous way of passing on information relating to the recognized text.

What is claimed is:

1. A correction device (3, 4) for correcting a text (ET) recognized by a speech recognition device (2) from a spoken text (GT), wherein an item of link information (LI) for each part of the spoken text (GT) flags the associated recognized text (ET), having memory means (8) for storing at least the spoken text (GT) and the recognized text (ET), and having reproduction means (13) for acoustically reproducing the spoken text (GT) and synchronously visually marking the associated recognized text (ET) flagged by the item of link information (LI) when a synchronous reproduction mode is activated in the correction device (3, 4), and having marking means (12, 15, 17) for storing marking information (WMI) in the memory means (8), which marking information (WMI) flags those parts of the recognized text (ET) and/or the spoken text (GI) that were reproduced at least once by the reproduction means (13) when the synchronous reproduction mode was activated, the reproduction means (13) being arranged to suppress the acoustic reproduction of unwanted parts of the spoken text (GT) when the synchronous reproduction mode is activated, which unwanted parts are flagged by suppression information (PMI, HMI, GMI, DMI, RMI) stored in the memory means (8).

2. A correction device (3, 4) as claimed in claim 1, wherein the reproduction means (13) are arranged to acoustically reproduce the unwanted parts of the spoken text (GT) flagged by the suppression information (PMI, HMI, GMI, DMI, RMI), if these unwanted parts are also flagged by the marking information (WMI) when the synchronous reproduction mode is activated.

3. A correction device (3, 4) as claimed in claim 1, wherein unwanted parts of the spoken text (GT) flagged by the suppression information (PMI, HMI, RMI) are formed by a pause in the spoken text (GT), repeated words or a hesitating sound.

4. A correction device (3, 4) as claimed in claim 1, wherein the reproduction means (13) are arranged for the visual marking of those parts of the recognized text (ET) that are flagged by the marking information (WMI).

5. A correction device (3, 4) as claimed in claim 1, wherein positioning means (18) are provided for positioning a text cursor (P2) identifying a text input position when the synchronous reproduction mode is interrupted to correct an incorrectly recognized word, and wherein the positioning means (18) are arranged to position the text cursor N words upstream of the word of the recognized text (ET) that was marked at the time of interruption of the synchronous reproduction mode if this part of the recognized text (ET) is flagged by the marking information (WMI), and wherein the positioning means (18) are arranged to position the text cursor M words upstream of the word of the recognized text (ET) that was marked at the time of interruption of the synchronous reproduction mode if this part of the recognized text (ET) is not flagged by any marking information (WMI).

6. A method of correcting a text (ET) recognized by a speech recognition device (2) from a spoken text (GT), wherein an item of link information (LI) for each part of the spoken text (GT) flags the associated recognized text (ET) and wherein the following steps are performed: storage of at least the spoken text (GT) and the recognized text (ET); when the synchronous reproduction mode is activated, acoustic reproduction of the spoken text (GT) and synchronous visual marking of the associated recognized text (ET) flagged by the link information (LI); storage of marking information (WMI), which marking information (WMI) flags those parts of the recognized text (ET) and/or of the spoken text (GT) that were reproduced at least once before when the synchronous reproduction mode was activated; and suppression of the acoustic reproduction of unwanted parts of the spoken text (GT) when the synchronous reproduction mode is activated, which unwanted parts are flagged by stored suppression information (PMI, HMI, GMI, DMI, RMI).

7. A method of correction as claimed in claim 6, wherein the following further steps are performed: acoustic reproduction of the unwanted parts of the spoken text (GI) flagged by the suppression information (PMI, HMI, GMI, DMI, RMI) when the synchronous reproduction mode is activated if such parts are additionally flagged by the marking information (WMI).

* * * * *